(12) United States Patent
Gritti et al.

(10) Patent No.: US 10,051,169 B2
(45) Date of Patent: Aug. 14, 2018

(54) ESTIMATING CONTROL FEATURE FROM REMOTE CONTROL WITH CAMERA

(71) Applicant: KONINKLIJKE PHILIPS N.V., Eindhoven (NL)

(72) Inventors: Tommaso Gritti, Breda (NL); Petrus Augustinus Maria Van Grinsven, Hooge Mierde (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 68 days.

(21) Appl. No.: 15/144,094

(22) Filed: May 2, 2016

(65) Prior Publication Data

US 2016/0248961 A1 Aug. 25, 2016

Related U.S. Application Data

(63) Continuation of application No. 13/983,638, filed as application No. PCT/IB2012/050728 on Feb. 17, 2012, now Pat. No. 9,332,169.

(30) Foreign Application Priority Data

Feb. 21, 2011 (EP) .................................... 11155161

(51) Int. Cl.
*H04N 5/232* (2006.01)
*G08C 17/00* (2006.01)
(52) U.S. Cl.
CPC ......... *H04N 5/23203* (2013.01); *G08C 17/00* (2013.01); *G08C 2201/32* (2013.01)

(58) Field of Classification Search
CPC .... H04N 5/23203; H04N 5/232; G08C 17/00; G06C 2201/32; G06F 3/0304
See application file for complete search history.

(56) References Cited

U.S. PATENT DOCUMENTS

| 5,488,675 A | 1/1996 | Hanna |
| 5,504,501 A | 4/1996 | Hauck et al. |

(Continued)

FOREIGN PATENT DOCUMENTS

| CN | 100461725 C | 2/2009 |
| EP | 0943211 A1 | 9/1999 |

(Continued)

*Primary Examiner* — Luong T Nguyen

(57) ABSTRACT

An apparatus estimates control features of remote controls comprising cameras for detecting light points from beacons located at or near devices that are to be controlled via the remote controls by letting the cameras further detect light points from non-beacons. Processors estimate the control features in response to information from the detections of the light points. The non-beacons comprise noise sources or any other sources different from the beacons. Memories store per time-interval the information per detection. The light coming from the beacons may be modulated light and the light coming from the non-beacons may be other light. The information may comprise coordinates, sizes and intensities of light points per detection and per time-interval. The control feature may comprise a pointing position, a distance, a rotation, a tilt, a location, a speed, an acceleration, a movement and/or a zoom of the remote control.

27 Claims, 3 Drawing Sheets

(56) References Cited

U.S. PATENT DOCUMENTS

| | | | |
|---|---|---|---|
| 6,776,334 B1 * | 8/2004 | Garg | G01S 1/70 |
| | | | 235/382 |
| 7,542,072 B2 | 6/2009 | Dementhon | |
| 7,566,858 B2 | 7/2009 | Hotelling et al. | |
| 7,940,986 B2 * | 5/2011 | Mekenkamp | G06F 3/017 |
| | | | 345/1.1 |
| 2005/0275630 A1 | 12/2005 | Butterworth et al. | |
| 2006/0023111 A1 | 2/2006 | Dementhon | |
| 2008/0121782 A1 | 5/2008 | Hotelling et al. | |
| 2008/0180396 A1 | 7/2008 | Lin et al. | |
| 2008/0212870 A1 * | 9/2008 | Tan | G01C 11/00 |
| | | | 382/154 |
| 2009/0009469 A1 | 1/2009 | Hsu et al. | |
| 2009/0051651 A1 | 2/2009 | Han et al. | |
| 2009/0135262 A1 * | 5/2009 | Ogasawara | G03B 15/02 |
| | | | 348/211.4 |
| 2009/0251559 A1 | 10/2009 | Mekenkakmp et al. | |

FOREIGN PATENT DOCUMENTS

| | | | |
|---|---|---|---|
| JP | 07322367 A | 12/1995 |
| JP | 2003208260 A | 7/2003 |
| JP | 2009522681 A | 6/2009 |
| WO | 9824242 A1 | 6/1998 |
| WO | 03049379 A1 | 6/2003 |

\* cited by examiner

ESTIMATING CONTROL FEATURE FROM REMOTE CONTROL WITH CAMERA

CLAIM OF PRIORITY

This application claims, pursuant to 35 USC 120, priority to and the benefit of the earlier filing date, as a Continuation application, of that patent application afforded Ser. No. 13/983,638 filed on Aug. 5, 2013, which claimed the benefit as a U.S. National Phase application under 35 USC 371 of International Application no. PCT/IB2012/050728, filed on Feb. 17, 2012, which claimed the benefit of European Patent Application no. 11155161.0, filed on Feb. 21, 2011. The contents of all of which are incorporated by reference herein.

FIELD OF THE INVENTION

The invention relates to an apparatus for estimating at least one control feature of a remote control, the remote control comprising a camera for detecting at least one light point originating from at least one beacon located at or near a device that is to be controlled via the remote control.

The invention further relates to a remote control comprising the apparatus, to a device comprising the apparatus, to a method for estimating at least one control feature of a remote control, the remote control comprising a camera for detecting at least one light point originating from at least one beacon located at or near a device that is to be controlled via the remote control, to a computer program product for performing the step of the method, and to a medium for storing and comprising the computer program product.

Examples of such a device are devices with displays and other devices that are to be controlled remotely.

BACKGROUND OF THE INVENTION

An apparatus for estimating at least one control feature of a remote control, the remote control comprising a camera for detecting at least one light point originating from at least one beacon located at or near a device that is to be controlled via the remote control, is known from Philips® uWand® technology.

A problem might come up, when a further light point is detected as well, that does not originate from a beacon, but for example originates from a noise source. Existing technology tries to filter and/or eliminate such further light points, which is not always easy.

SUMMARY OF THE INVENTION

It is an object of the invention to provide an improved apparatus for estimating at least one control feature of a remote control, the remote control comprising a camera for detecting at least one light point originating from at least one beacon located at or near a device that is to be controlled via the remote control.

Further objects of the invention are to provide a remote control comprising the apparatus, a device comprising the apparatus, a method for estimating at least one control feature of a remote control, the remote control comprising a camera for detecting at least one light point originating from at least one beacon located at or near a device that is to be controlled via the remote control, a computer program product for performing the step of the method, and a medium for storing and comprising the computer program product.

According to a first aspect, an apparatus is provided for estimating at least one control feature of a remote control, the remote control comprising a camera for detecting at least one light point originating from at least one beacon located at or near a device that is to be controlled via the remote control and for detecting at least one light point originating from at least one non-beacon, the light coming from the at least one beacon being different from the light coming from the at least one non-beacon, the apparatus comprising
 a processor for estimating the at least one control feature in response to information from detections of the light points.

To estimate the at least one control feature, the processor not only uses information from a detection of a light point from a beacon but also uses information from a detection of a light point from a non-beacon. In other words, the light point originating from a noise source, which light point in the past had to be filtered and/or eliminated, is now used for creating additional information. A presence of additional information can be used for compensating for missing information and for creating more information to improve an estimation of control feature.

The non-beacon comprises a noise source or any other source different from a beacon.

An embodiment of the apparatus is defined by the at least one light point originating from the at least one beacon comprising first and/or second light points originating from first and/or second beacons, and the at least one light point originating from the at least one non-beacon comprising third and/or fourth light points originating from first and/or second non-beacons, the camera being arranged for detecting the first and/or second light points per time-interval and the third and/or fourth light points per time-interval, the information comprising first and/or second information from first and/or second detections of the first and/or second light points per time-interval and third and/or fourth information from third and/or fourth detections of the third and/or fourth light points per time-interval, and the apparatus further comprising
 a memory for storing per time-interval the first and/or second information and the third and/or fourth information.

By detecting light points per time-interval and by storing information per time-interval, light points can be tracked and more information is collected. A further light point from a third beacon or further light points from third and fourth beacons etc. are not to be excluded. And a yet further light point from a third non-beacon or yet further light points from third and fourth non-beacons etc. are not to be excluded.

An embodiment of the apparatus is defined by, whereby of the first and/or second beacons only the first beacon is present and whereby of the first and/or second non-beacons only the first non-beacon is present, the processor being arranged for, in case the first light point cannot be detected in a time-interval, estimating the first information for this time-interval by processing the third information from this time-interval and the first and third information from a previous time-interval. This embodiment defines an estimation in case one beacon and one non-beacon are present.

An embodiment of the apparatus is defined by, whereby of the first and/or second beacons the first beacon and the second beacon are present and whereby of the first and/or second non-beacons only the first non-beacon is present, the processor being arranged for, in case the first light point cannot be detected in a time-interval, estimating the first information for this time-interval by processing the second and third information from this time-interval and the first and second and third information from a previous time-interval. This embodiment defines an estimation in case two beacons and one non-beacon are present.

An embodiment of the apparatus is defined by, whereby of the first and/or second beacons the first beacon and the second beacon are present and whereby of the first and/or second non-beacons the first non-beacon and the second non-beacon are present, the processor being arranged for, in case the first light point cannot be detected in a time-interval, estimating the first information for this time-interval by processing the second and third and fourth information from this time-interval and the first and second and third and fourth information from a previous time-interval. This embodiment defines an estimation in case one beacon and two non-beacons are present.

An embodiment of the apparatus is defined by, whereby of the first and/or second beacons the first beacon and the second beacon are present and whereby of the first and/or second non-beacons the first non-beacon and the second non-beacon are present, the processor being arranged for improving an estimation of the at least one control feature in response to the first and second and third and fourth information from this time-interval and/or the first and second and third and fourth information from a previous time-interval. This embodiment defines an improve of an estimation in case two beacons and two non-beacons are present.

An embodiment of the apparatus is defined by the light coming from the at least one beacon being modulated light and the light coming from the at least one non-beacon being other light.

An embodiment of the apparatus is defined by the information comprising a coordinate and/or a size and/or an intensity per detection and per time-interval.

An embodiment of the apparatus is defined by the at least one control feature comprising a pointing position on the device and/or a distance between the remote control and the device and/or a rotation of the remote control and/or a tilt of the remote control and/or a location of the remote control with respect to the device.

An embodiment of the apparatus is defined by the at least one control feature comprising a speed of the remote control and/or an acceleration of the remote control and/or a movement of the remote control and/or a zoom of the remote control.

According to a second aspect, a remote control is provided comprising the apparatus as defined above.

According to a third aspect, a device is provided comprising the apparatus as defined above.

According to a fourth aspect, a method is provided for estimating at least one control feature of a remote control, the remote control comprising a camera for detecting at least one light point originating from at least one beacon located at or near a device that is to be controlled via the remote control and for detecting at least one light point originating from at least one non-beacon, the light coming from the at least one beacon being different from the light coming from the at least one non-beacon, the method comprising a step of estimating the at least one control feature in response to information from detections of the light points.

According to a fifth aspect, a computer program product is provided for performing the step of the method as defined above.

According to a sixth aspect, a medium is provided for storing and comprising the computer program product as defined above.

An insight could be that a detection of a further light point that originates from a non-beacon could be used to create additional information.

A basic idea could be that a control feature is to be estimated in response to information from detections of light points from a beacon as well as a non-beacon.

A problem to provide an improved apparatus for estimating at least one control feature of a remote control has been solved.

A further advantage could be that a processing capacity for filtering and/or eliminating a light point originating from a non-beacon can be reduced and/or avoided.

These and other aspects of the invention will be apparent from and elucidated with reference to the embodiments described hereinafter.

DETAILED DESCRIPTION OF EMBODIMENTS

Figure 1:
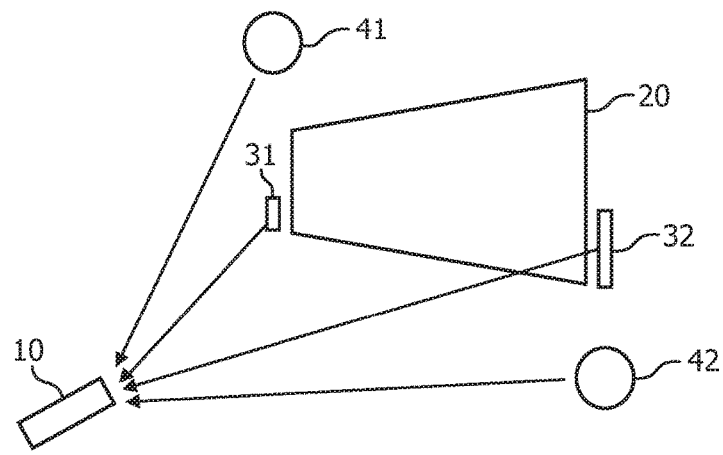
FIG. 1 shows a remote control and a device in use and shows beacons near the device and non-beacons.

In the FIG. 1, a remote control 10 and a device 20 are shown in use. Near the device 20, beacons 31 and 32 are shown. Alternatively, these beacons 31 and 32 may form part of the device 20. Further, non-beacons 41 and 42 are shown. The light coming from the beacons 31 and 32 is for example infrared light and/or is for example light modulated in frequency, wavelength, intensity, on/off mode etc. The light coming from the non-beacons 41 and 42 is other light, for example other infrared light and/or otherwise modulated light or not modulated light. The non-beacons 41 and 42 are for example noise sources such as lamps, reflections, sunlight etc.

Figure 2:
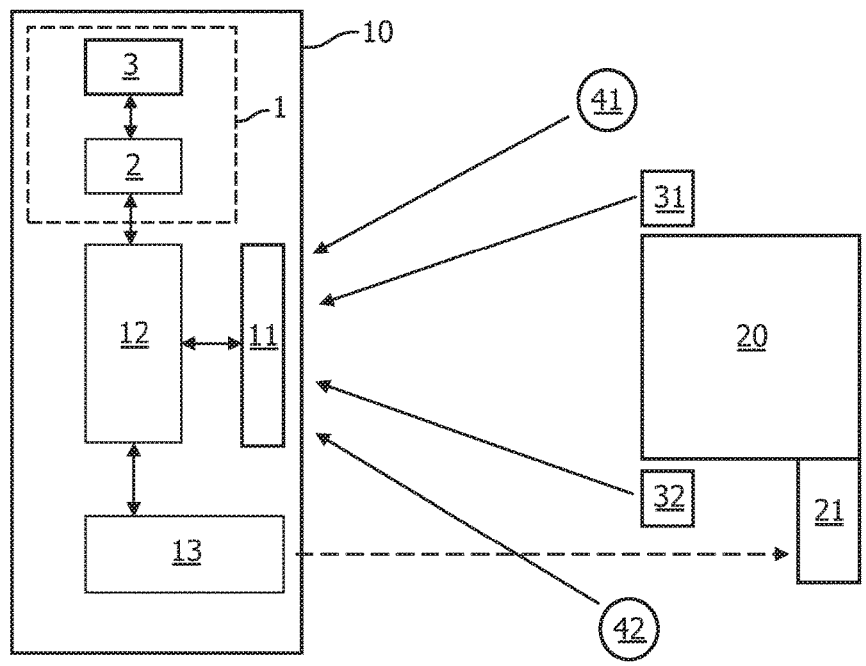
FIG. 2 shows a remote control and a device schematically, the remote control comprising an apparatus and a camera.

In the FIG. 2, a remote control 10 and a device 20 are shown schematically. The remote control 10 comprises an apparatus 1 and a camera 11. The camera 11 is coupled to a controller 12. One side of the controller 12 is coupled to a transmitter 13 and an other side of the controller 12 is coupled to a processor 2 of the apparatus 1. The processor 2 is coupled to a memory 3 of the apparatus 1. The transmitter 13 sends control data to a receiver 21 coupled to the device 20 for controlling the device 20. The camera 11 detects light points on a map per time-interval, the light points originating from the beacons 31 and 32 and from the non-beacons 41 and 42, as shown in the FIG. 3-5. The control data is usually exchanged wirelessly, for example via a radio frequency signal or another wireless signal.

Alternatively, the apparatus 1 may form part of the controller 12, or vice versa. Alternatively, the apparatus 1 may take the place of the controller 12, or the apparatus 1 may be located between the controller 12 and the transmitter 13. The receiver 21 may alternatively form part of the device 20 etc.

Figure 3:
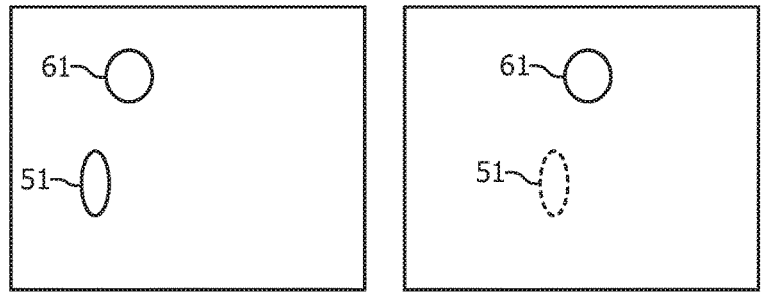
FIG. 3 shows first maps created by the camera of the remote control for two different time-intervals.
Figure 4:
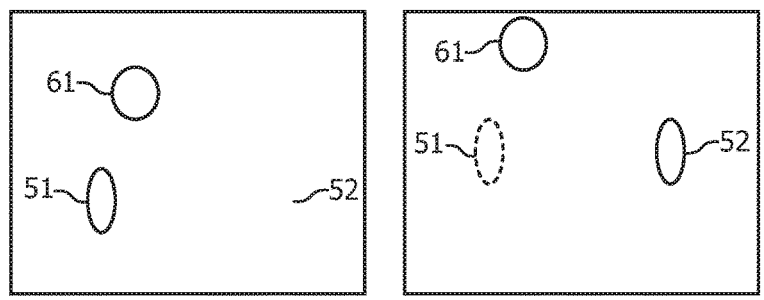
FIG. 4 shows second maps created by the camera of the remote control for two different time-intervals.
Figure 5:
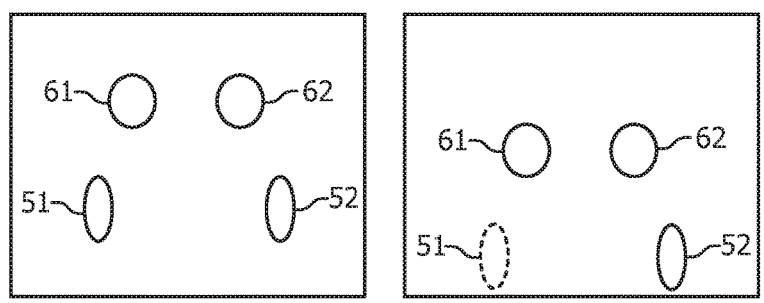
FIG. 5 shows third maps created by the camera of the remote control for two different time-intervals.

Also in view of the FIG. 3-5, the camera 11 detects first and/or second light points 51 and/or 52 originating from the beacons 31 and/or 32 and detects third and/or fourth light points 61 and/or 62 originating from the non-beacons 41 and/or 42. The processor 2 estimates at least one control feature in response to information from detections of the light points 51, 52, 61 and/or 62. This control feature is to be sent to the device 20 as the control data or is to be converted into the control data for controlling the device 20.

The camera 11 is preferably arranged for detecting the first and/or second light points 51 and 52 per time-interval and the third and/or fourth light points 61 and 62 per time-interval. The information comprises first and/or second information from first and/or second detections of the first and/or second light points 51 and 52 per time-interval and third and/or fourth information from third and/or fourth detections of the third and/or fourth light points 61 and 62 per time-interval. The memory 3 stores per time-interval the first and/or second information and the third and/or fourth information.

The information comprises for example a coordinate and/or a size and/or an intensity (of a light point 51, 52, 61 and/or 62) per detection and per time-interval. The at least one control feature may comprise a pointing position on the device 20 and/or a distance between the remote control 10 and the device 20 and/or a rotation of the remote control 10 and/or a tilt of the remote control 10 and/or a location of the remote control 10 with respect to the device 20. The at least one control feature may comprise a speed of the remote control 10 and/or an acceleration of the remote control 10 and/or a movement of the remote control 10 and/or a zoom of the remote control 10. The zoom or a change thereof may further be used for instructing the device 20. The remote control 10 may add further data to the control data for instructing the device 20, for example in response to a user having pressed a button, or for example coming from an acceleration sensor or a tilt sensor etc.

To be able to distinguish the light coming from a beacon 31-32 on the one hand and a non-beacon 41-42 on the other hand, the camera 11 may for example be arranged to detect the frequency or the wavelength or the intensity or the on/off mode etc. of the modulated light from the beacon 31-32 and/or the camera 11 may for example be arranged to detect a feature of the otherwise modulated light or the non-modulated light from the non-beacon 41-42. Detections of the frequency and the wavelength and the intensity and the on/off mode etc. are common in the art. In addition, for a detection of the on/off mode, a duration of a time-interval may need to be chosen longer than a period of the on/off mode, and/or a period of the on/off mode may need to be chosen shorter than a duration of a time-interval, and/or further time (if present) between two subsequent time-intervals may need to be chosen properly compared to a period of the on/off mode, and/or a period of the on/off mode may need to be chosen properly compared to further time (if present) between two subsequent time-intervals, and/or several time-intervals may need to be used etc. Said detections may alternatively be shifted partly or entirely from the camera 11 into the controller 12 and/or the apparatus 1.

In the FIG. 3, first maps are shown created by the camera 11 of the remote control 10 for two different time-intervals. In this case the beacon 32 and the non-beacon 42 are for example not present or covered all the time. At a first time-interval or a first moment in time, the camera 11 creates a map comprising the light point 51 from the beacon 31 and the light point 61 from the beacon 41. At a second time-interval or a second moment in time, the camera 11 creates a map comprising the light point 61 from the beacon 41 only owing to the fact that the light point 51 from the beacon 31 is temporarily non-detectable as indicated by the dashed line. However, by using the information from both maps, a new position of the light point 51 can be calculated, here for example under an assumption that no rotation has taken place. Clearly, a user, compared to the first time-interval, is pointing a bit more to the left in the second time-interval owing to the fact that the light points 51 and 61 are located a bit more to the right.

In the FIG. 4, second maps are shown created by the camera 11 of the remote control 10 for two different time-intervals. In this case the non-beacon 42 is for example not present or covered all the time. At a first time-interval or a first moment in time, the camera 11 creates a map comprising the light point 51 from the beacon 31 and the light point 52 from the beacon 32 and the light point 61 from the beacon 41. At a second time-interval or a second moment in time, the camera 11 creates a map comprising the light point 52 from the beacon 32 and the light point 61 from the beacon 41 only owing to the fact that the light point 51 from the beacon 31 is temporarily non-detectable as indicated by the dashed line. However, by using the information from both maps, a new position of the light point 51 can be calculated. Clearly, a user, compared to the first time-interval, is pointing a bit lower in the second time-interval owing to the fact that the light points 51 and 52 and 61 are located a bit higher.

In the FIG. 5, third maps are shown created by the camera 11 of the remote control 10 for two different time-intervals. At a first time-interval or a first moment in time, the camera 11 creates a map comprising the light point 51 from the beacon 31 and the light point 52 from the beacon 32 and the light point 61 from the beacon 41 and the light point 62 from the beacon 42. At a second time-interval or a second moment in time, the camera 11 creates a map comprising the light point 52 from the beacon 32 and the light point 61 from the beacon 41 and the light point 62 from the beacon 42 only owing to the fact that the light point 51 from the beacon 31 is temporarily non-detectable as indicated by the dashed line. However, by using the information from both maps, a new position of the light point 51 can be calculated. Clearly, a user, compared to the first time-interval, is pointing a bit higher in the second time-interval owing to the fact that the light points 51 and 52 and 61 and 62 are located a bit lower. Here an affine transform could be used to estimate a position of a missing light point.

Preferably, the processor 2 is arranged for improving an estimation of the at least one control feature in response to the first and second and third and fourth information from the second time-interval and/or the first and second and third and fourth information from the first time-interval. Clearly, when more information than strictly necessary is available, the information can be checked for irregularities and estimations can be improved.

When looking at the maps at different time-intervals, translations, rotations, angles, scaling, shifting etc. can be determined and assignments can be checked and/or corrected. More maps and more time-intervals and more light points are not to be excluded. A time-interval may have any kind of duration and may comprise one moment in time or more than one moment in time. Between two subsequent time-intervals, further time may be present or not.

Usually, a light point will cover more than one pixel. In case a shape of the light point or an intensity of the light point is not perfectly symmetrical, per light point a rotation can be determined by comparing both maps. In case the shape of the light point and the intensity of the light point are perfectly symmetrical, two or more light points are required to determine a rotation by comparing both maps. Light points may also be known as blobs. Blob data may include coordinate data, size data and brightness data.

A user interface system such as a pointer or gesture based control system comprises a remote control with a camera such as a camera based pointer device and a device such as a target device and a beacon such as a stationary beacon. The beacon may for example comprise infrared light emitting diodes. Blob data from up to eight blobs may be sent to the device that may process the blob data and use a process result to control the device, e.g., by adapting a graphical user interface on a display screen. To be able to reliably detect the blobs from any other noise sources, the blobs detected by the camera should be tracked across frames, such that for example their intensity modulation can be correlated in time and checked against a known modulation of the beacons. The beacons may further have a known distance between each other and/or known locations with respect to each other and/or with respect to the device. By exploiting maps with blobs across adjacent frames, positions of missing, occluded, blobs can be estimated. More robust tracking of beacons can be achieved, by exploiting blobs from one or more noise sources.

Figure 6:
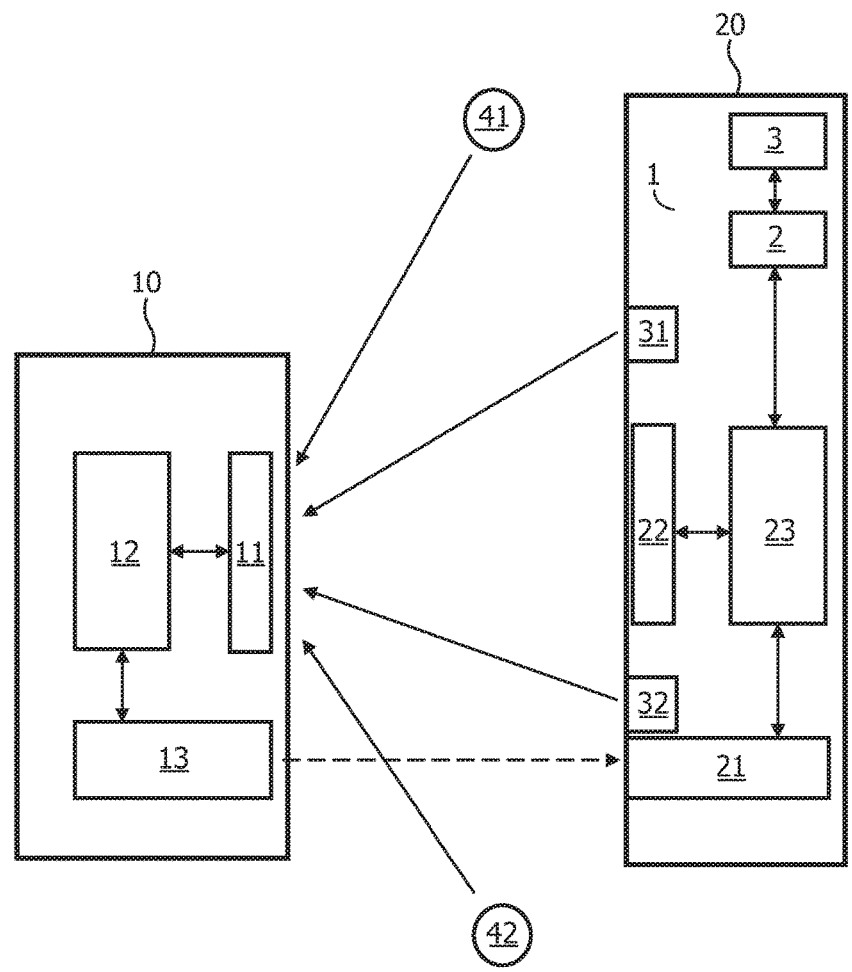
FIG. 6 shows a remote control and a device schematically, the remote control comprising a camera, and the device comprising an apparatus.

In the FIG. 6, a remote control 10 and a device 20 are shown schematically, the remote control 10 comprising a camera 11, and the device 20 comprising an apparatus 1. The FIG. 6 differs from the FIG. 2 in that the apparatus 1 has been shifted from the remote control 10 into the device 20. Further, the beacons 31 and 32 and the receiver 21 form part of the device 20, that further comprises a screen 22 coupled to a controller 23 that is coupled to the receiver 21 and to the processor 2 of the apparatus 1. In this case the transmitter 13 will send map data to the receiver 21 for controlling the device 20. Thereto, in or near the device 20, the map data is to be processed as discussed for the FIG. 2-5.

Alternatively, the apparatus 1 may form part of the controller 23, or vice versa. Alternatively, the apparatus 1 may take the place of the controller 23, or the apparatus 1 may be located between the controller 23 and the receiver 21 etc.

Alternatively, the apparatus 1 may be located outside the remote control 10 and/or outside the device 20 and being arranged to communicate via a wired or wireless coupling with the remote control 10 and/or the device 20.

Summarizing, an apparatus 1 estimates control features of remote controls 10 comprising cameras 11 for detecting light points 51, 52 from beacons 31, 32 located at or near devices 20 that are to be controlled via the remote controls 10 by letting the cameras 11 further detect light points 61, 62 from non-beacons 41, 42. Processors 2 estimate the control features in response to information from the detections of the light points 51, 52, 61, 62. The non-beacons 41, 42 comprise noise sources or any other sources different from the beacons 31, 32. Memories 3 store per time-interval the information per detection. The light coming from the beacons 31, 32 may be modulated light and the light coming from the non-beacons 41, 42 may be other light. The information may comprise coordinates, sizes and intensities of light points 51, 52, 61, 62 per detection and per time-interval. The control feature may comprise a pointing position, a distance, a rotation, a tilt, a location, a speed, an acceleration, a movement and/or a zoom of the remote control 10.

While the invention has been illustrated and described in detail in the drawings and foregoing description, such illustration and description are to be considered illustrative or exemplary and not restrictive; the invention is not limited to the disclosed embodiments.

For instance, device (20) can be replaced throughout the text and claims by an object that is associated with a device (20). As example, pointing in a proximity direction of a beacon that is in proximity to a radiator knob (an object) can be used to generate a control signal for an associated central heating (a device). Another example is a window-blinds (an object) being pointed at by which a (user invisible) blinds controller (a device) can be controlled.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

What is claimed is:

1. A remote control device comprising:
   a sensor; and
   a processor configured to:
      receive, from the sensor, an input from at least one beacon source wherein the input from a corresponding one of the at least one beacon source is received in at least one of: a first time period and a second time period; and
      receive, from the sensor, an input from at least one non-beacon source wherein the input from a corresponding one of the at least one non-beacon source is received in at least one of: the first time period and the second time period,
      determine the received inputs of the at least one beacon source and at least one non-beacon source present in the first time period and the second time period;
      determine a change of a corresponding one of the available received inputs of the at least one beacon source and at least one non-beacon source between the first time period and the second time period;
      develop a map for each of the first time period and the second time period, each of the maps of the first time period and the second time period being determining with regard to a known coordinate, wherein a position of each of the received inputs of the at least one beacon source and the received inputs of the at least one non-beacon source is determined on a corresponding map, wherein the change of corresponding ones of the available received inputs of the at least one beacon source and the available received inputs of at least one non-beacon source between the first time period and the second time period represents said change in position;
      estimate a change of the remote control device based on the determined change of received inputs of the at least one beacon source and at least one non-beacon source; and
      determine a control feature of the remote control device based on the estimated change.

2. The device of claim 1, wherein the control feature comprises at least one of: a pointing position, a distance from a second device, a rotation, a tilt, a location with respect to the second device, a speed, an acceleration, a movement and a zoom.

3. The device of claim 1, wherein the sensor comprises at least one of: a camera, an IR sensor and a visible light sensor.

4. The device of claim 1, wherein the received inputs from the at least one beacon source is a light having a known modulation.

5. The device of claim 1, wherein the maps comprise:
at least one of: a size and an intensity of each of the received inputs of the at least one beacon source and at least one non-beacon source.

6. The device of claim 1, wherein a position of each of the at least one beacon source is known with respect to said known coordinate.

7. The device of claim 1, further comprising:
a transmitter, wherein the processor is configured to:
transmit, through the transmitter, data associated with the determined control feature.

8. The device of claim 7, wherein the data associated with the determined control feature provides an instruction.

9. A control system comprising:
a controlling device comprising:
a detection unit; and
a transmitting unit; and
a controlled device comprising:
a receiving device;
the control system further comprising:
at least one beacon source; and
a processor configured to:
receive, from the detection unit, at least one input associated with a transmission from at least one of the at least one beacon source in at least one of: a first time period and a second time period;
receive, from the detection unit, at least one second input in at least one of: the first time period and in the second time period, the at least one second input associated with a transmission from a corresponding source not associated with the at least one beacon source;
determine which of the received inputs of the at least one beacon source and the source not associated with the at least one beacon source, is present in the first time period and the second time period;
determine a change between each of the received inputs present in the first time period and the second time period;
develop a map for each of the first time period and the second time period, each of the maps being determining with regard to a known coordinate, wherein a position of each of the inputs received from the beacon source and the inputs received from the source not associated with the beacon source is determined on a corresponding map, wherein the change of the received inputs represents a change in position;
estimate a change of the controlling device based on the determined change of received inputs present in the first time period and the second time period;
determine a control function of the controlling device based on the estimated change; and
transmit, through a transmitter, data associated with the determined control function.

10. The system of claim 9, wherein the processor is located within one of: the controlling device and the controlled device.

11. The system of claim 9, wherein the at least one beacon source is located, with respect to the controlled device, in at least one of: external to and internal to.

12. The system of claim 9, wherein the control function comprises at least one of: a pointing position, a distance from a second device, a rotation, a tilt, a location with respect to the second device, a speed, an acceleration, a movement and a zoom.

13. The system of claim 9, wherein the detection unit is at least one of: a camera, an IR sensor and a visible light sensor.

14. The system of claim 9, wherein the received inputs from the at least one beacon source is a light having a known modulation.

15. The system of claim 9, wherein the maps comprises:
at least one of: a size and an intensity of each of the inputs received.

16. The system of claim 9, further comprising:
a memory in communication with the processor, the memory storing the received at least one input from the beacon source and the received at least one second input from the source not associated with the beacon source of each of the first time period and the second time period.

17. The system of claim 9, wherein the at least one beacon source not associated with the at least one non-beacon source represents at least a noise source.

18. The system of claim 9, wherein the first time period and the second time period are dis-joint in time.

19. A method, operable in a processor, for controlling a controllable device, the method causing the processor to:
receive, through a sensor, at least one first input signal, at least one of the at least one input signal associated with a beacon, in each of a plurality of non-time overlapping time slots;
generate a map of the received at least one second input signal for each of the plurality of non-time overlapping time slots, wherein each map representing a position of each of the received at least one input signal;
determine which of the received first and second input signals is available in at least two maps;
determine a change of a position of the first and second received input signals between the at least two maps;
determine a control function based on the determined change position; and
generate a control signal comprising information associated with the determined control function.

20. The method of claim 19, wherein the control function comprises at least one: a pointing position, a distance from a second device, a rotation, a tilt, a location with respect to the second device, a speed, an acceleration, a movement and a zoom.

21. The method of claim 19, wherein the sensor comprises at least one of: a camera, an IR sensor and a visible light sensor.

22. The method of claim 19, wherein the received input from the at least one beacon source is a light having a known modulation.

23. The method of claim 19, wherein the device of claim 1, wherein the received input is from an unmodulated light source.

24. The method of claim 19, wherein the maps comprise:
at least one of: a size and an intensity of each of the received inputs.

25. The method of claim 19, further comprising:
storing the received inputs associated with at least two time periods.

26. The method of claim 19, further comprising:
eliminating the received inputs not associated with the at least one beacon.

27. A computer readable storage medium that is not a transitory propagating signal or wave, the computer readable storage medium containing control information for a method for operating a controllable device, the method comprising:
- receive, through a sensor, at least one first input associated with a beacon in each of a plurality of non-time overlapping time slot:
- generate, by a processor, a map of the recited at least one second input signal for each of the plurality of no-time overlapping time slots, wherein each map representing a position of each of the received at least one input signal;
- determine, by the processor, which of the received first and second input signal are available in at least two maps,
- determine, by the processor, the received first and second input signals between the at least two maps:
- determine, by the processor, a control function of the remote control device based on the determined change position; and
- generate, by the processor, a control signal comprising information associated with the determined control function.

* * * * *